US011959328B2

(12) United States Patent
Eguchi et al.

(10) Patent No.: US 11,959,328 B2
(45) Date of Patent: Apr. 16, 2024

(54) DOOR DRIVE DEVICE

(71) Applicant: Brose Fahrzeugteile SE & Co. Kommanditgesellschaft, Bamberg, Bamberg (DE)

(72) Inventors: Takafumi Eguchi, Aichi (JP); Sebastian Vogt, Hallstadt (DE); Daniel Steiner, Frankenblick (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 32 days.

(21) Appl. No.: 17/430,863

(22) PCT Filed: Feb. 14, 2019

(86) PCT No.: PCT/EP2019/053679
§ 371 (c)(1),
(2) Date: Aug. 13, 2021

(87) PCT Pub. No.: WO2020/164712
PCT Pub. Date: Aug. 20, 2020

(65) Prior Publication Data

US 2022/0145684 A1 May 12, 2022

(51) Int. Cl.
*E05F 15/00* (2015.01)
*E05F 5/02* (2006.01)
(Continued)

(52) U.S. Cl.
CPC ............ *E05F 5/025* (2013.01); *E05F 15/627* (2015.01); *E05F 15/70* (2015.01);
(Continued)

(58) Field of Classification Search
CPC . E05F 15/614; E05F 3/16; E05F 5/025; E05F 15/627; E05F 15/63; E05F 5/00;
(Continued)

(56) References Cited

U.S. PATENT DOCUMENTS 8,104,822 B2 * 1/2012 Kriese .................... B60J 1/2086 160/370.21
2009/0217596 A1 * 9/2009 Neundorf ................ E05B 81/20 49/506
(Continued)

FOREIGN PATENT DOCUMENTS

DE 102009001668 A1 9/2010
DE 102016223667 * 11/2016 ............ E05F 15/627
(Continued)

*Primary Examiner* — Chi Q Nguyen
(74) *Attorney, Agent, or Firm* — Dickinson Wright PLLC

(57) ABSTRACT

A door drive device for adjusting and/or locking a vehicle door relative to a vehicle body including an adjustment member, a drive element operatively coupled to the adjustment member such that the adjustment member is movable with respect to the drive element for moving the vehicle door, a sensor device for measuring a measuring quantity indicative of a movement of the vehicle door to provide a sensor signal, a brake device operatively connected to the drive element for braking a movement of the vehicle door, and a control device for controlling operation of the door drive device. The control device is configured to compute, from the sensor signal obtained from the sensor device, an acceleration value indicative of an acceleration of the vehicle door and evaluate the acceleration value to distinguish movement of the vehicle door caused by a gravity force from movement caused by a user action.

20 Claims, 8 Drawing Sheets

(51) Int. Cl.
*E05F 15/627* (2015.01)
*E05F 15/70* (2015.01)

(52) U.S. Cl.
CPC ... *E05Y 2201/232* (2013.01); *E05Y 2201/408* (2013.01); *E05Y 2201/434* (2013.01); *E05Y 2201/654* (2013.01); *E05Y 2201/664* (2013.01); *E05Y 2400/20* (2013.01); *E05Y 2400/36* (2013.01); *E05Y 2800/116* (2013.01); *E05Y 2900/531* (2013.01)

(58) Field of Classification Search
CPC ........... E05Y 2201/702; E05Y 2400/32; E05Y 2201/26; E05Y 2201/726; E05Y 2201/72; E05Y 2201/70; E05Y 2201/232; E05Y 2201/654; E05Y 2201/664; E05Y 2400/20; E05Y 2400/36; E05Y 2800/116; E05Y 2400/45; E05Y 2201/266; E05Y 2201/408; E05Y 2900/531; E05Y 2201/434; F16H 19/0628; F16H 1/46
USPC ......... 49/334, 335, 336, 337, 340, 341, 349, 49/350
See application file for complete search history.

(56) References Cited

U.S. PATENT DOCUMENTS

| | | | | |
|---|---|---|---|---|
| 2010/0287837 | A1* | 11/2010 | Wuerstlein | H03K 17/955 327/517 |
| 2013/0097940 | A1* | 4/2013 | Brown | E05F 15/605 49/506 |
| 2014/0083011 | A1* | 3/2014 | Sumiya | E05F 15/40 49/28 |
| 2016/0010379 | A1* | 1/2016 | Sauerwein | E05F 15/70 49/350 |
| 2016/0060942 | A1* | 3/2016 | Hansen | E05D 15/1042 49/352 |
| 2017/0138099 | A1* | 5/2017 | Wittorf | F16H 25/20 |
| 2017/0247926 | A1* | 8/2017 | Elie | E05F 15/40 |
| 2018/0023334 | A1* | 1/2018 | Kwak | E05F 15/76 49/31 |
| 2019/0128041 | A1* | 5/2019 | Haberberger | E05F 15/622 |
| 2022/0268074 | A1* | 8/2022 | Leonard | E05F 15/41 |

FOREIGN PATENT DOCUMENTS

| | | | | |
|---|---|---|---|---|
| DE | 102018205138 | * | 10/2019 | E05F 15/63 |
| EP | 3299561 | A1 | 3/2018 | |
| WO | 2018002158 | A1 | 1/2018 | |

* cited by examiner

DOOR DRIVE DEVICE

CROSS-REFERENCE TO RELATED APPLICATIONS

This application is the U.S. National Phase of PCT Application No. PCT/EP2019/053679 filed on Feb. 14, 2019, the disclosure of which is hereby incorporated in its entirety by reference herein

TECHNICAL FIELD

The present disclosure relates to a door drive device for use in a motor vehicle.

BACKGROUND

A door drive device of this kind may include an adjustment member, a drive element operatively connected to the adjustment member such that the adjustment member is movable with respect to the drive element for moving the vehicle door relative to the vehicle body, a sensor device for measuring a measuring quantity indicative of a movement of the vehicle door to provide a sensor signal, and a control device for controlling operation of door device.

Such a vehicle door can, for example, be configured as a vehicle side door or as a tailgate or any other movable flap of a vehicle.

SUMMARY

One or more objects of the present disclosure may be to provide a door drive device and a method for operating a door drive device which allow for a reliable operation of the door drive device in particular to counteract an unintentional movement of a vehicle door caused by gravity forces.

Accordingly, the control device is configured to compute, from the sensor signal obtained from the sensor device, an acceleration value indicative of an acceleration of the vehicle door, wherein the control device is further configured to evaluate the acceleration value to distinguish a moving of the vehicle door caused by a gravity force and a moving of the vehicle door caused by a user action.

Movement of a vehicle door caused by gravity and a movement caused by a user action are generally distinguishable. Generally, a gravity force acts onto a vehicle door generally by means of a constant acceleration, such that a movement of a vehicle door caused by gravity should generally exhibit a constant acceleration. In contrast, a movement caused by a user generally will exhibit an acceleration which differs from acceleration due to gravity and for example is not constant, such as if a user grabs on a vehicle door and intentionally moves the vehicle door in a guided fashion.

In addition, additional parameters may be taken into account, such as a speed signal and sensor readings of sensor devices such as an inclination sensor or the like providing information with respect to a parking position of a vehicle and a slope the vehicle may be parked on.

In one embodiment, the control device is configured to initiate a braking of a movement of the vehicle door in case a moving of the vehicle door caused by a gravity force is detected. Hence, if it is detected, from the evaluation the acceleration value indicative of an acceleration of the vehicle door, that the movement of the vehicle door likely is caused by gravity, such movement shall be counteracted. For this, for example a brake device is controlled such that the movement of the vehicle door is braked such that, beneficially, the movement is stopped, upon which the vehicle door may be locked in its current position. An uncontrolled movement caused by gravity hence is effectively prevented.

The braking of the vehicle door may be cause for example by a brake device acting onto a gearing element (e.g. the drive element), such that by means of the brake device a movement of the gear element may be braked. In this case a drive device may be permanently coupled to a drive train.

Alternatively, a brake device may serve as a coupling device to couple a drive element to a drive train, the brake device being switchable between a coupling state, a brake state and a free state. In the brake state a braking of the movement of the vehicle door may be caused.

Yet alternatively, an electromotive drive device may electrically be controlled to reduce a movement of the vehicle door, without requiring a brake device.

In one embodiment, the control device is configured to repeatedly compute the acceleration value over time or position. As an example, the control device may be configured to evaluate whether the acceleration value is substantially constant over a predetermined period of time or a predetermined period of position. If the control device concludes that the acceleration value is substantially constant over a predetermined period of time or a predetermined period of position, the control device issues a control signal to for example cause the brake device to brake a movement of the vehicle door with respect to the vehicle body, such that a movement caused by gravity is prevented.

Hence, by evaluating if the acceleration of the vehicle door is substantially constant, it is derived whether movement of the vehicle door is likely caused by gravity or not. It herein is concluded that the movement takes place at a substantially constant acceleration if over a predetermined period of time or a predetermined period of position no substantial change in acceleration occurs. Hence, over a predetermined time or a predetermined range of position it is observed whether and how acceleration changes. If acceleration does not substantially change, it is assumed that the acceleration is constant and thus may be due to gravity.

In one embodiment it may be concluded that the acceleration value is substantially constant if the acceleration value lies within a predefined range over the predetermined period of time or the predetermined period of position. If over a specified time range or a specified range of position the acceleration value does not substantially change, as it does not leave a predefined range bound by a lower acceleration threshold value and an upper acceleration threshold value, it is concluded that the movement takes place at substantially constant acceleration, such that the movement may be caused by gravity and is concluded to be caused by gravity for example if in addition the overall speed of movement of the vehicle door is small, as it lies below a predetermined speed threshold.

In one embodiment, the control device is configured to determine a rate of change of the acceleration value and to conclude for a potential movement due to gravity based on the rate of change. Generally, a vehicle door may initially be moved manually by a user acting onto the vehicle door, for example by pushing the moving the vehicle door in an impulse fashion or by continuously moving and holding onto the vehicle door. At some point the user may release the vehicle door, in case of which the vehicle door may continue to move, wherein the movement of the vehicle door now is influenced by gravity forces acting onto the vehicle door, such gravity forces potentially causing a deceleration or acceleration of the vehicle door, depending on the movement direction and the direction of the gravity forces.

For determining whether a movement is due substantially to gravity forces acting onto the vehicle door, the control device hence, beneficially, should be able to determine whether a user has released the vehicle door. This may take place by determining a rate of change of the acceleration of the vehicle door. If an abrupt change in the rate of change (derivative) of the acceleration of the vehicle door is detected, this may indicate that after this abrupt change now only gravity acts onto the vehicle door, which can subsequently be verified by detecting whether the acceleration remains substantially constant over a predetermined period of time or a predetermined period of position. If subsequently to the abrupt change the acceleration is substantially constant for a predetermined period of time or a predetermined period of position, it may be concluded for a movement due to gravity, and the control device may initiate a braking of the movement of the vehicle door.

In one embodiment, the control device is configured to compute, from the sensor signal obtained from the sensor device, a speed value indicative of a moving speed of the vehicle door, wherein the control device is configured to evaluate the speed value to distinguish a moving of the vehicle door caused by a gravity force and a moving of the vehicle door caused by a user action.

Generally, in addition to a substantially constant acceleration, a movement caused by gravity generally will occur at a rather slow speed, such that the evaluation of both the speed of the vehicle door and the acceleration of the vehicle door may allow for the determination whether a movement caused by gravity may be present. In contrast, a movement caused by a user generally will exhibit an acceleration which differs from acceleration due to gravity, and in addition a user will generally move a vehicle door at a rather fast speed, for example by pushing or by pulling on the vehicle door, such that a combined evaluation of speed and acceleration may reliably be used to distinguish a movement of the vehicle door caused by a user action and a movement of the vehicle door caused by gravity.

In one embodiment, the control device may be configured to initiate a braking of a movement of the vehicle door only if—in addition to for example a substantially constant acceleration value—the speed value derived from the sensor signal is smaller than a predefined speed threshold. Hence, in addition to the evaluation of the acceleration value the speed value is taken into account. Only if movement of the vehicle door takes place at a rather low speed, which is smaller than a predefined speed threshold, it is concluded that the movement of the vehicle door is due to gravity such that a braking action is initiated to prevent movement of the vehicle door.

In one embodiment the sensor device may be configured to sense position and/or angular speed of the vehicle door. For this, the sensor device may be configured to sense a rotation of a drive shaft to which the drive element is coupled. The sensor device herein may be configured to sense position in a relative manner or in an absolute manner by in a relative manner counting rotations of the drive shaft or by in an absolute manner detecting the absolute angular position of the drive shaft.

The sensor device may for example comprise one or multiple Hall sensors suitable for sensing position in a relative manner. Alternatively, the sensor device may comprise for example a magnetic disk attached to the drive shaft such that an absolute detection of position of the drive shaft is possible.

In an alternative embodiment, the sensor device may be implemented by a speed sensor for sensing the rotational speed (angular velocity) of the vehicle door or by an accelerometer for sensing acceleration on the vehicle door and may be placed on the vehicle door for a direct measurement on the vehicle door.

In addition to the sensor device for detecting a movement of the vehicle door (from which speed and acceleration can be derived) an inclination sensor may be placed on the vehicle body. The inclination sensor is configured to sense an inclination of the vehicle. From a reading of the inclination sensor it hence may be determined whether the vehicle is parked at an inclined position at a slope.

The inclination sensor may sense inclination in all three spatial directions and hence in three dimensions. From the reading of the inclination sensor it may be estimated what gravity forces act onto the vehicle door. As an example, if the vehicle is parked at an inclined position, gravity forces acting onto the vehicle door in an opened position may be substantially larger (or smaller) than in a situation in which the vehicle is parked in a flat, non-inclined position.

Based on an inclination of the vehicle, parameters used for determining whether a movement due to gravity is present may be adjusted. As an example, thresholds for the acceleration and/or the speed may be adjusted, and/or the length of the period of time over which the acceleration shall substantially be constant can be adapted. In this way it can be taken into account that at large gravity forces acting onto the vehicle door, for example, the speed by which the vehicle door is moved due to gravity is substantially larger than when only a small gravity forces act onto the vehicle door. This can be taken into account by suitably adjusting threshold values such that the determination whether a movement due to gravity is present can be adaptively modified dependent on a parking position of the vehicle.

In one embodiment, the door drive device may include a brake device operatively connected to the drive element for braking a movement of the vehicle door with respect to the vehicle body.

In one embodiment, the brake device is implemented by a coupling device which is transferable between different states. As an example, the brake device in a brake state provides for a braking action for braking a movement of the vehicle door with respect to the vehicle body. The brake device in this respect may for example act onto the drive shaft connected to the drive element such that in this way a movement of the drive element and thus a movement of the vehicle door with respect to the vehicle body is counteracted.

In addition, the brake device may assume a coupling state for establishing a force flow between the vehicle door and the vehicle body, wherein the brake device may be switchable to an uncoupling state for allowing a free pivoting of the vehicle door with respect to the vehicle body. In the coupling state, for example, an electric drive motor of the door drive device may be coupled to the drive element such that a driving force can be introduced into the drive element for electromotively moving the vehicle door with respect to the vehicle body. In the uncoupling state, in turn, the drive motor may be effectively decoupled from the drive element, such that a free pivoting movement of the vehicle door with respect to the vehicle body, for example by manual user action, is possible without loading the drive motor.

The brake device may for example have the shape of a drum brake device as described for example in WO 2018/

002158 A1. The brake device may however also be designed in a different manner, for example as a lamella brake, a magnetic brake or the like.

The brake device herein may serve the function, in addition, of a coupling device, wherein it also is conceivable to implement a brake device and a coupling device by different functional units.

The object is also achieved by a method for operating a door drive device for adjusting and/or locking a vehicle door relative to a vehicle body, the method comprising: measuring, using a sensor device, a measuring quantity indicative of a movement of the vehicle door to provide a sensor signal; braking, using a brake device, a movement of the vehicle door with respect to the vehicle body, wherein the brake device is operatively connected to a drive element which is operatively coupled to an adjustment member such that the adjustment member is movable with respect to the drive element for moving the vehicle door relative to the vehicle body; and controlling, using a control device, operation of the door drive device. Herein, the method may include the further step of computing, using the control device, from the sensor signal obtained from the sensor device an acceleration value indicative of an acceleration of the vehicle door, and evaluating, using the control device, the acceleration value to distinguish a moving of the vehicle door caused by a gravity force and a moving of the vehicle door caused by a user action.

The advantages and advantageous embodiments described above for the door drive device equally apply also to the method, such that it shall be referred to the above.

BRIEF DESCRIPTION OF THE DRAWINGS

The idea underlying the invention shall be explained in more detail below according to the embodiments of the figures. Herein.

DETAILED DESCRIPTION

Figure 1:
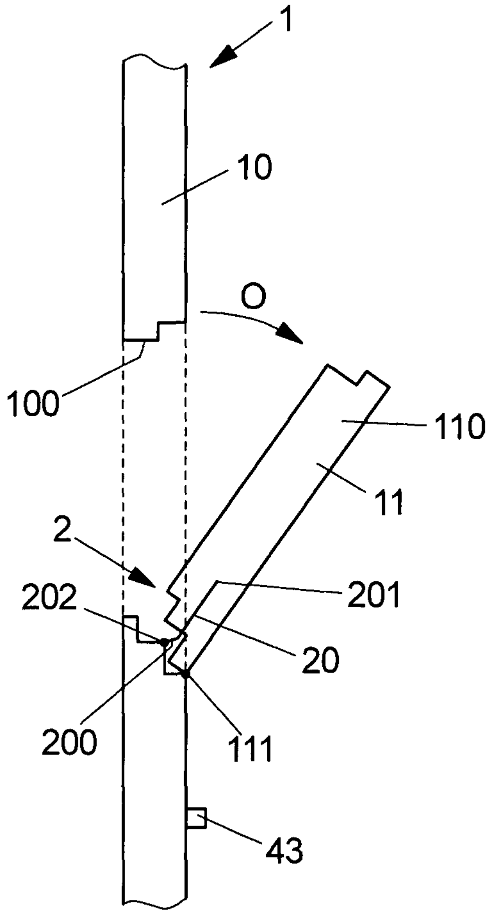
FIG. 1 shows a schematic view of a vehicle door on a vehicle body.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A door drive device as disclosed for example in WO 2018/002158 A1 may include an adjustment member in the shape of a retaining strap coupled for example to the vehicle body and operatively connected to a drive element in the shape of a cable drum. The coupling of the adjustment member to the drive element is established by means of a coupling element in the shape of a pull cable, which is wound around the cable drum and by means of which the cable drum can be moved with respect to the adjustment member in order to cause a movement of the vehicle door with respect to the vehicle body. A drive device is coupled to the drive element by means of a gearing and a coupling device serving as a brake device, the coupling device being designed such that in a coupling state a coupling of the drive device to the drive element is established, in an uncoupling state however a free pivoting movement of the vehicle door with respect to the vehicle body is possible. In a brake state of the coupling device a movement of the drive element and in this way a movement of the vehicle door with respect to the vehicle body is braked, such that for example a manual movement of the vehicle door can be controlled.

The door drive device in principle may be configured as an adjusting and/or locking device and may be used to electromotively adjust the vehicle door or to mechanically lock the vehicle door in a currently assumed position. If the door drive device is configured as an electromotive adjusting device, it may include a drive device in the form of an electric drive motor by means of which the vehicle door can be electromotively moved. In contrast, the door drive device may substantially act as a mechanical locking device for providing for a mechanical locking of the vehicle door in an open position, such that the vehicle door is held in position so that the vehicle door cannot easily slam shut from the open position, at least not in an uncontrolled manner.

The door drive device allows for a movement of the vehicle door by manual user action. As an example, if a coupling device (for example implemented by the brake device) is in an uncoupling state and hence a force flow in between the vehicle door and the vehicle body is disrupted, a user may act onto the vehicle door and may freely pivot the vehicle door with respect to the vehicle body in order to move the vehicle door between a closed position and a fully opened position.

In case a free movement of the vehicle door is possible, for example because a coupling device is in its uncoupling state, a movement of the vehicle door may also be caused by other forces, for example by gravity in case a vehicle is parked on a slope. Such movement may be unintentional and hence if possible should be avoided in order to prevent an uncontrolled movement of the vehicle door towards the fully opened position or towards the fully closed position, which may otherwise cause harm to a user or may damage the vehicle door or an object in the path of the vehicle door.

FIG. 1 shows, in a schematic view, a vehicle 1 including a vehicle body 10 and an adjusting element in the form of a vehicle door 11 which is arranged on the vehicle body 10 via a hinge 111 such that it can be pivoted about a pivot axis with respect to the vehicle body 10 along an opening direction O.

The vehicle door 11 can, for example, be a vehicle side door or a tailgate. In a closed position, the vehicle door 11 conceals a vehicle opening 100 in the vehicle body 10, for example a side door opening or a tailgate opening.

Figure 2:
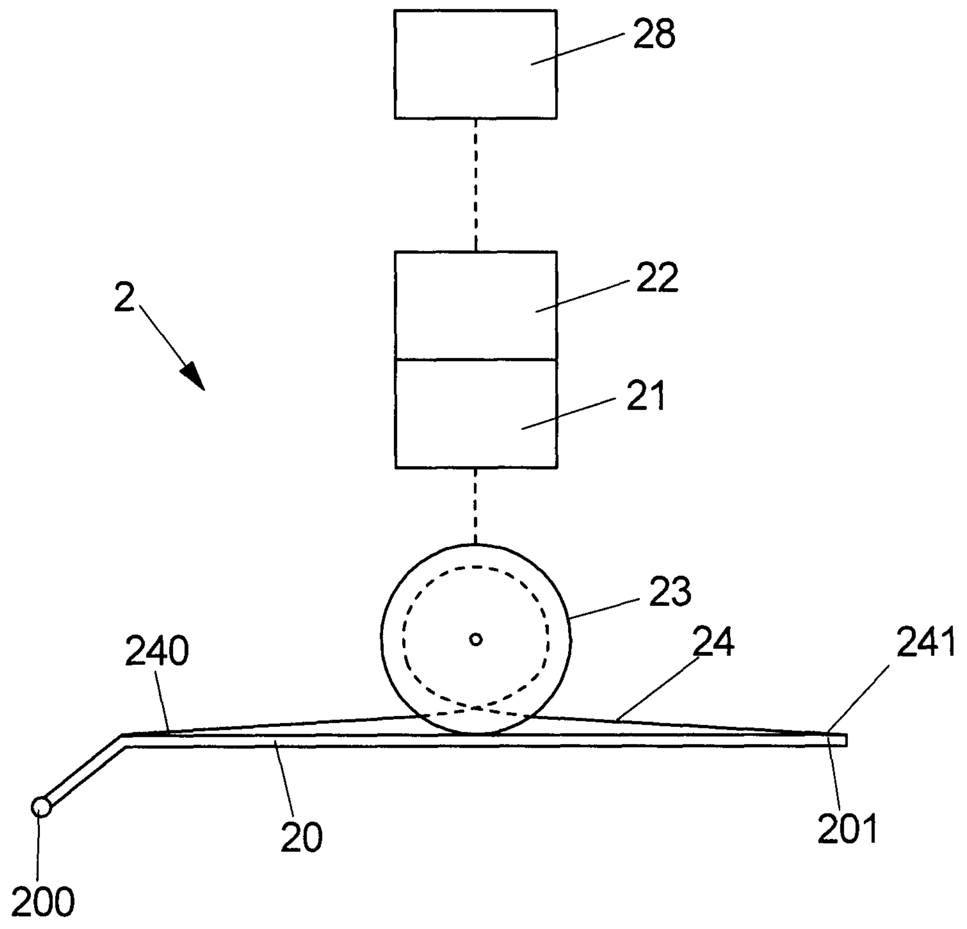
FIG. 2 shows a schematic view of a door drive device having a drive motor, a brake device, a control device and an adjustment member for moving the vehicle door.

The vehicle door 11 can electromotively be moved from its closed position to an open position via a door drive device 2 arranged in a door interior 110. The door drive device 2, as schematically illustrated in FIG. 2 and as illustrated in an embodiment in FIGS. 3 to 5, may include a drive motor 22 which is coupled, in the shown embodiment, via a brake device 21 to an adjustment member 20 via which adjusting forces can be transmitted between the vehicle door 11 and the vehicle body 10. In the noted embodiments, the drive motor 22 is fixed to the vehicle door 11, while the adjustment member 20, designed in the manner of a so-called door retaining strap, is pivotably connected at an end 200 to the vehicle body 10.

In the embodiments of the door drive device 2 shown in FIGS. 2 and 3 to 5, the drive motor 22 serves to drive a drive element 23 in the form of a cable drum which is coupled to the adjustment member 20 via a coupling element 24 in the form of a flexible traction element, such as in the form of a traction cable (for example a steel cable), configured to transmit (exclusively) tensile forces. The cable drum 23 can, for example, be supported on the longitudinally extended adjustment member 20 and may roll along the adjustment member 20 in order to move the adjustment member 20 relative to the cable drum 23.

The coupling element 24 is connected to the adjustment member 20 via a first end 240 in the vicinity of the end 200 of the adjustment member 20 and via a second end 241 in the vicinity of a second end 201 of the adjustment member 20, and is wound around the drive element 23 in the shape of the cable drum. When the drive element 23, driven by the drive motor 22, is rotated, the coupling element 24 in the shape of the traction element (traction cable) moves relative to the drive element 23 so that the drive element 23 is moved relative to the adjustment member 20, resulting in displacement of the vehicle door 11 relative to the vehicle body 10.

It should be noted at this point that other types of power transmission arrangements are conceivable. For example, the drive motor 22 can also drive a pinion which is in meshing engagement with a tooth rack forming the adjustment member 20. Alternatively, the door drive device may be configured as a spindle drive comprising, for example, a rotatable spindle that engages with a spindle nut.

The brake device 21, in the noted embodiments, serves as a coupling device to couple the drive motor 22 with the drive element 23 or to uncouple it from the drive element 23. In a coupling state, the brake device 21 establishes a flux of force between the drive motor 22 and the drive member 23 such that a rotational movement of a motor shaft 220 of the drive motor 20 is transmitted to the drive member 23 and, consequently, the drive member 23 is set into a rotational movement so as to thereby introduce an adjusting force into the adjustment member 20. In an uncoupling state, in contrast, the drive motor 22 is uncoupled from the drive element 23, so that the drive motor 22 can be moved independently of the drive element 23 and, conversely, the drive element 23 can be moved independently of the drive motor 22. In this uncoupling state, the vehicle door 11 may be manually moved with respect to the vehicle body 10 without applying a load to the drive motor 22.

The brake device 21 can in addition assume a third state, corresponding to a brake state, in which coupling elements are in contact with each other in a braking manner. A first coupling element herein is operatively connected to a motor shaft of the drive motor 22, while a second coupling element is operatively connected to the drive element 23. In this brake state the brake device 21 provides a braking force during manual movement of the vehicle door 11, caused by a sliding, frictional contact of the coupling elements.

Figure 3:
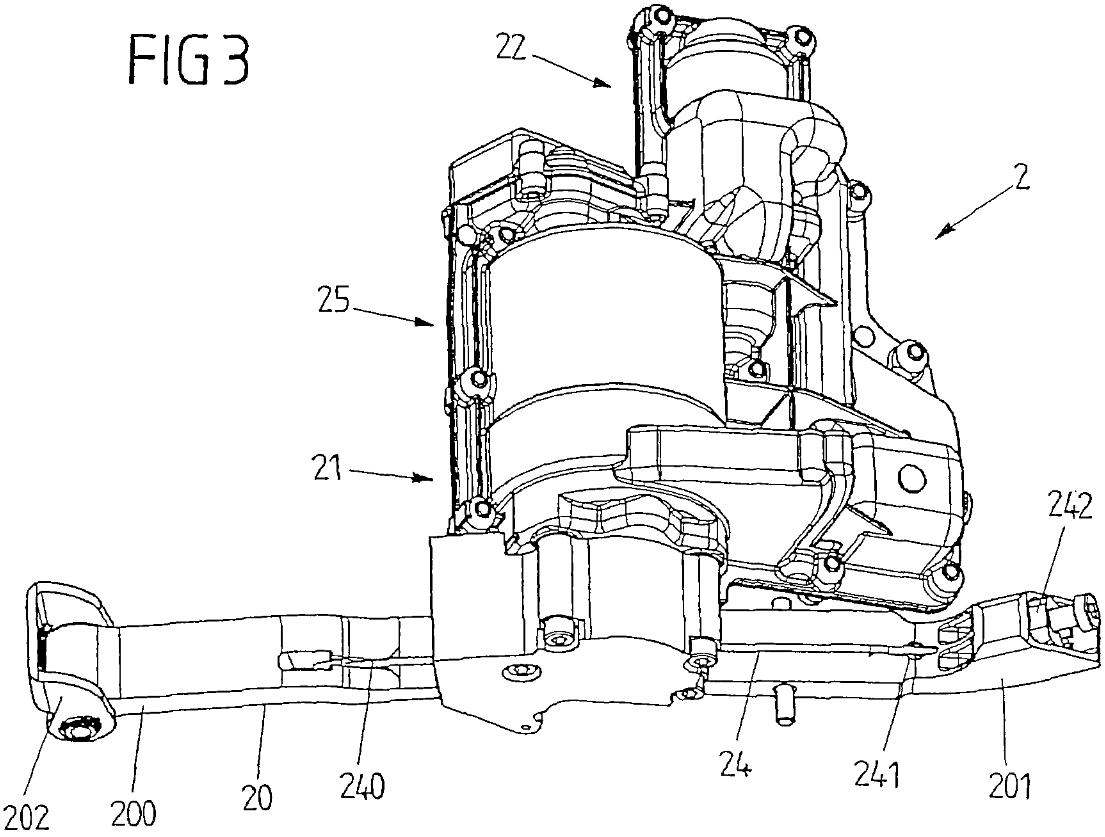
FIG. 3 shows a view of an embodiment of a door drive device for moving a vehicle door.
Figure 4:
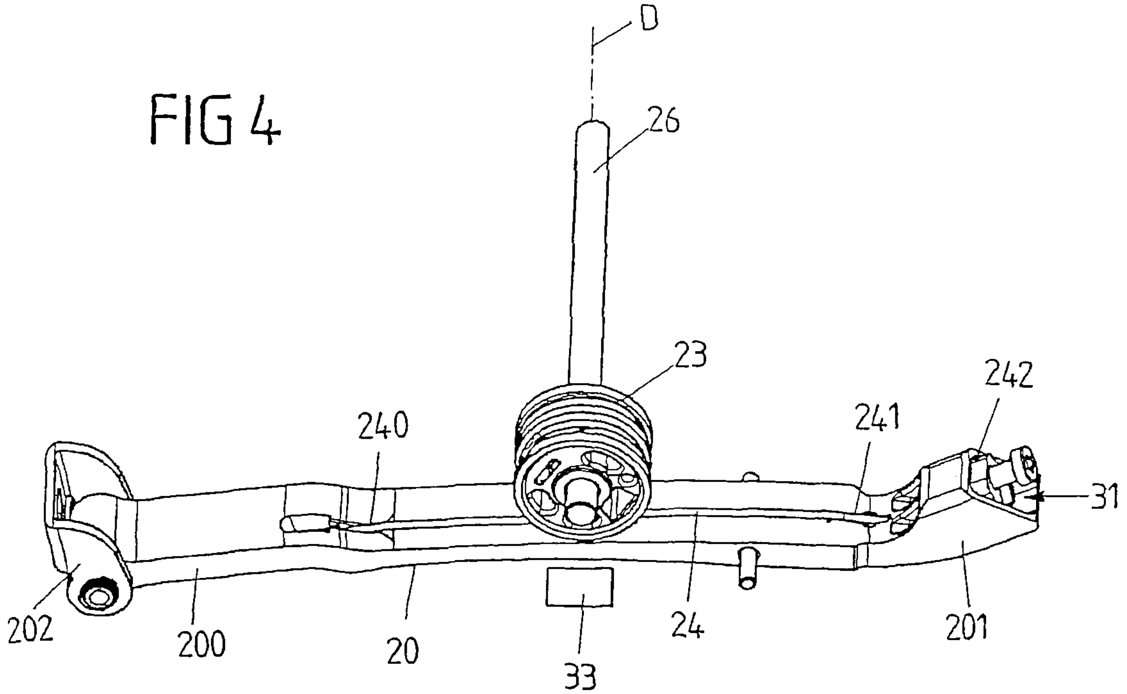
FIG. 4 shows a view of a sub-assembly of the door drive device.
Figure 5:
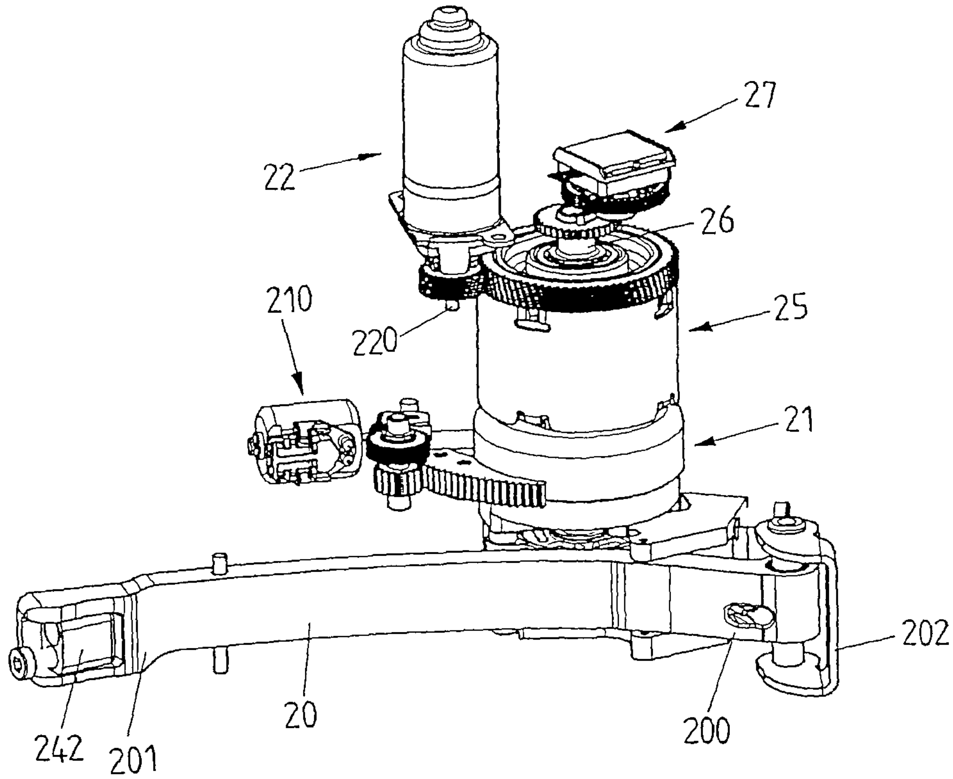
FIG. 5 shows a view of a drive motor, a gearbox and a brake device of the door drive device.

In the example shown in FIGS. 3 to 5, the drive motor 22 may include a motor shaft 220, which is set into a rotary motion during operation of the door drive device 2 and is operatively connected to a gear 25 (e.g. a planetary gear). A shaft 26, which is rotatable about an axis of rotation D, is driven via the gear 25 and carries the drive element 23 in the form of the cable drum, such that the drive element 23 can be driven by rotating the shaft 26, thereby causing the coupling element 24 to move with respect to the drive element 23 such that the adjustment member 20 is adjusted for moving the vehicle door 11.

The door drive device 2 may include a sensor device 27 arranged at an end of the shaft 26 opposite the drive element 23 and configured to determine, during operation, the absolute rotational position of the shaft 26. The sensor device 27 may for example comprise a magnetic disk coupled to the shaft 26 and a magnetic sensor for detecting a position of the magnetic disk.

The brake device 21, which can be electrically actuated via an actuator 210, in its coupling state establishes a force flow between the gear 25 and the shaft 26, so that in the coupling state of the brake device 21 an adjusting force can be transmitted from the drive motor 22 to the shaft 26 and in this way to the adjustment member 20. In its uncoupling state, on the other hand, the brake device 21 disrupts the force flow between the drive motor 22 and the shaft 26, so that the adjustment member 20 can be adjusted relative to the drive motor 22 without applying a force to the drive motor 22.

As schematically shown in FIG. 2, the operation of the drive motor 22 is controlled via a control device 28 arranged, for example, on a carrier plate of a door module of the vehicle door 11. Such a carrier element can, for example, carry different functional components of the vehicle door, such as a window regulator, a loudspeaker, a door lock or the like. In this context, the control device 28 can be used to control the door drive device 2, but also to control other functional components of the vehicle door 11.

The door drive device 2, as explained by reference to FIGS. 1 to 5, is used on the one hand to electromotively move the vehicle door 11 and on the other hand to lock the vehicle door 11 in an open position. In a locking position the brake device 21 is in its coupling state and thereby establishes a force flow between the vehicle door 11 and the vehicle body 10, so that the vehicle door 11—e.g. due to a self-locking of the gear 25 and/or the drive motor 22—is held in its open position. The vehicle door 11 therefore cannot easily, at least not in an uncontrolled manner, move out of an open position once it has been opened.

It is desirable to enable a user to easily adjust the vehicle door 11. For this it is to be detected when a user interacts with the vehicle door 11 in order, for example, to close the vehicle door 11 from the open position or to open it further in the opening direction O. If a user applies a force to the vehicle door 11, for example by pushing or pulling on the vehicle door 11, this shall be recognized as an adjustment request in order to initiate an electromotive adjustment of the vehicle door 11 or to permit a manual adjustment of the vehicle door 11 by the user.

If an adjustment request of a user is detected, the control device 28 may be configured in different ways to initiate an adjustment of the vehicle door 11 in an electromotive manner or to allow a manual adjustment of the vehicle door 11.

If the vehicle door 11 is to be adjusted by an electric motor when an adjustment request is detected, the control unit 28 controls the drive motor 22 to electromotively adjust the vehicle door 11 once an adjustment request is detected. In this case, the brake device 21 remains in its closed (coupling) state.

If, in contrast, a manual movement of the vehicle door 11 shall be enabled when an adjustment request is detected, the control device 28 controls the brake device 21, once an adjustment request is detected, to transfer the brake device 21 into its free (uncoupling) state so that the force flow between the vehicle door 11 and the vehicle body 10 is disrupted and the vehicle door 11 can freely be moved manually.

If the brake device 21 is in its free, uncoupling state, a free pivoting of the vehicle door 11 with respect to the vehicle body 10 is possible. If, for example, the brake device 21 is switched to its free, uncoupling state in case for example erroneously a request for movement is detected or in case the vehicle door 11 is not (yet) locked in a currently assumed position by switching the brake device 21 to its coupling state, a free pivoting movement of the vehicle door 11 may be caused both by a user action and by other forces acting onto the vehicle door 11, for example gravity forces in case a vehicle is parked on a slope and hence at an inclined position of the vehicle door 11, causing gravity to act onto the vehicle door 11 towards the fully opened position or towards the closed position.

Hence, if gravity forces act along the opening direction O onto the vehicle door 11 and in case the brake device 21 is in its free, uncoupling state, a movement of the vehicle door 11 caused by gravity is possible, such movement potentially being undesired. Such movement therefore shall be avoided.

Figure 6:
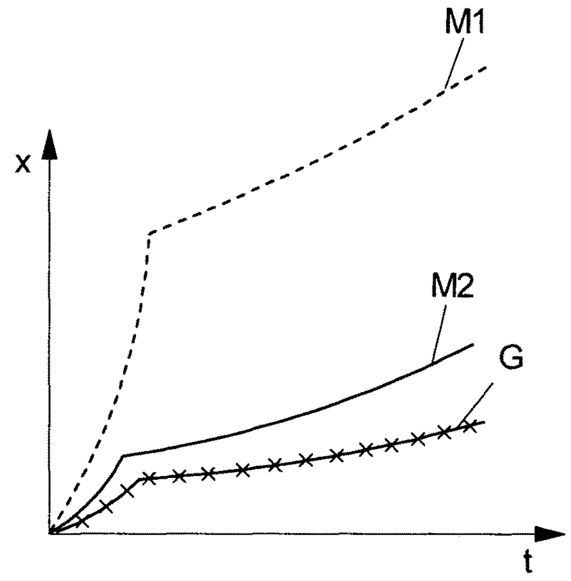
FIG. 6 shows a graph of position signals of a vehicle door for movements caused by user action and a movement caused by gravity.
Figure 7:
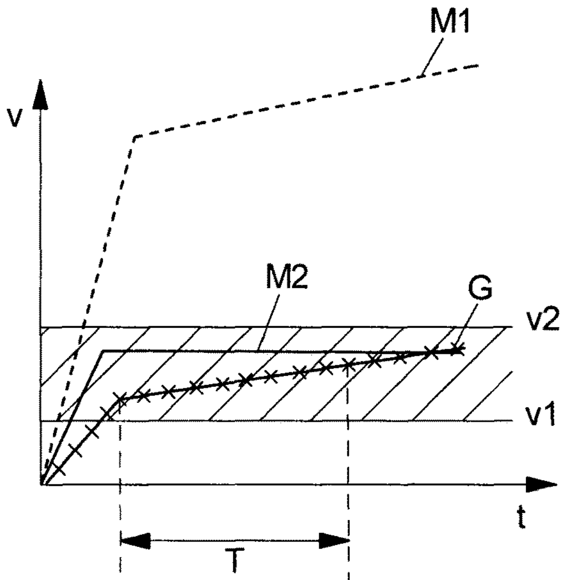
FIG. 7 shows a graph of speed signals of movements caused by user action and a movement caused by gravity.

In FIG. 6 position signals associated with movements caused by a user action (signals M1, M2) and a movement caused by a gravity (signal G) are shown over time. In FIG. 7 corresponding velocity signals for the different movements M1, M2, G are shown, and in FIG. 8 corresponding acceleration signals for the different movements M1, M2, G are shown, in each case over time.

Figure 8:
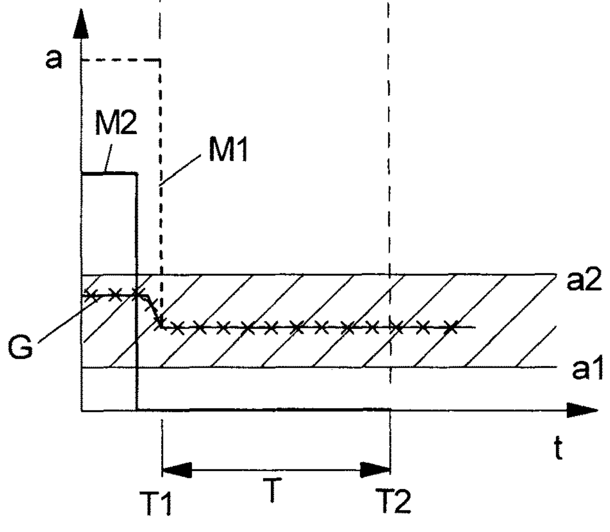
FIG. 8 shows a graph of acceleration signals of movements caused by user action and a movement caused by gravity.

Generally, a movement caused by gravity will take place at (approximately) a constant acceleration, as visible from the acceleration signal G in FIG. 8. As an example, in an initial phase forces may act onto the vehicle door 11, for example caused by a rattling on the vehicle door 11 or the like, which may cause to switch the brake device 21 from its coupling state to its free, uncoupling state. If subsequent to time T1 substantially only gravity acts onto the vehicle door 11, movement takes place at constant acceleration, wherein such movement will generally take place at rather low speed, as this is visible from signal G in FIG. 7.

Hence, a movement caused by gravity can be characterized by a substantially constant acceleration over time or position (FIG. 8) and by a low speed of movement (FIG. 7).

A movement caused by a user action, for example by a user manually grabbing a vehicle door to move the vehicle door 11 in a guided fashion or by applying a pushing or pulling impulse action onto the vehicle door 11, will in general differ from a movement caused by gravity, as for a user action acceleration may not be constant and/or the speed of movement of the vehicle door 11 will be substantially larger.

In FIGS. 6 to 8 position signals (FIG. 6), velocity signals (FIG. 7) and acceleration signals (FIG. 8) for two different types of manual movement M1, M2 are shown.

Movement M1 herein relates to a type of movement in which a user pushes or pulls, by applying a force impulse, on the vehicle door 11, such that the vehicle door 11 is caused to move, after termination of the impulse, due to the force applied by the impulse. After termination of the impulse, no further acceleration caused by the user acts onto the vehicle door 11, but gravity may act onto the vehicle door 11, such that the acceleration of signal M1 (FIG. 8) is constant (but non-zero) after termination of the impulse. The velocity for this movement M1 however is rather large (FIG. 7).

Movement M2 in contrast relates to a movement during which a user continuously acts onto the vehicle door 11 and moves the vehicle door 11 in a guided fashion by for example grabbing a handle of the vehicle door 11. In this case, after an initial impulse, the vehicle door 11 may be moved at constant speed (FIG. 7) and at a corresponding zero acceleration (FIG. 8).

From this it can be concluded that a manual movement M1, M2 can be distinguished from a movement G caused by gravity by observing speed and acceleration. As an example, if it can be concluded that acceleration over a predetermined period of time T (or, alternatively, over a predetermined period of position) is substantially constant and if at the same time the speed of the movement of the vehicle door 11 is rather low, the movement of the vehicle door 11 may likely be caused by gravity.

The control device 28 hence is configured to evaluate, from for example a sensor signal obtained from the sensor 27 monitoring movement of the drive shaft 26, whether the vehicle door 11 is moved at substantially constant acceleration and at a low speed.

If it is found that within a predetermined period of time T (or alternatively within a predetermined period of position) acceleration is substantially constant (as illustrated in FIG. 8) and the speed is low (as illustrated in FIG. 7), it may be concluded at the time T2 that the movement likely is due to gravity, such that the control device 28 issues a control command to the brake device 21 for applying a braking action to the drive element 23 in order to brake a movement of the vehicle door 11. The brake device 21 hence is transferred into its brake state, such that a further movement of the vehicle door 11 is braked (upon which the brake device 21 may switch to the coupling state in order to lock the vehicle door 11 in a currently assumed position).

The control device 28 may for example be configured to conclude that a substantially constant acceleration is present if the acceleration, within a predetermined period of time T (or alternatively within a predetermined period of position) lies within a range bound by a lower acceleration threshold value a1 and an upper acceleration threshold value a2, as illustrated in FIG. 8.

The sensor signal herein may be averaged (by for example applying a running averaging filter) in order to compensate for outliers.

In addition, the control device 28 may be configured to conclude that the speed is low if for example the speed of movement lies below an upper velocity threshold value v2 and, optionally, in addition above a lower velocity threshold value v1, as illustrated in FIG. 7.

If both conditions are fulfilled, it is concluded for a movement caused by gravity, such that the brake device 21 is caused to apply a braking action to the drive element 23.

The movements M1, M2 in this way are distinguished from the movement of G caused by gravity, such that the movements M1, M2 are not falsely recognized as a movement caused by gravity. As an example, for movement M1 the movement of the vehicle door 11 takes place at a high speed, as visible from FIG. 7, well outside the range defined by bounds v1, v2. For movement M2, which corresponds to a movement by manually guiding the vehicle door 11, acceleration is substantially 0 after time T1, as shown in FIG. 8, such that the acceleration for this movement M2 lies below the lower bound a1 of the acceleration range bound by thresholds a1, a2.

The bounds a1, a2, v1, v2 may for example be user configurable. In addition, the period of time T (or alternatively a period of position) may be user configurable, such that the control device 28 may be programmed and adapted for example to different vehicles and different vehicle doors.

FIGS. 9 to 12 show different graphs illustrating another embodiment for controlling a movement of a vehicle door 11 dependent on a detection of a movement of the vehicle door 11 due to gravity.

Figure 9:
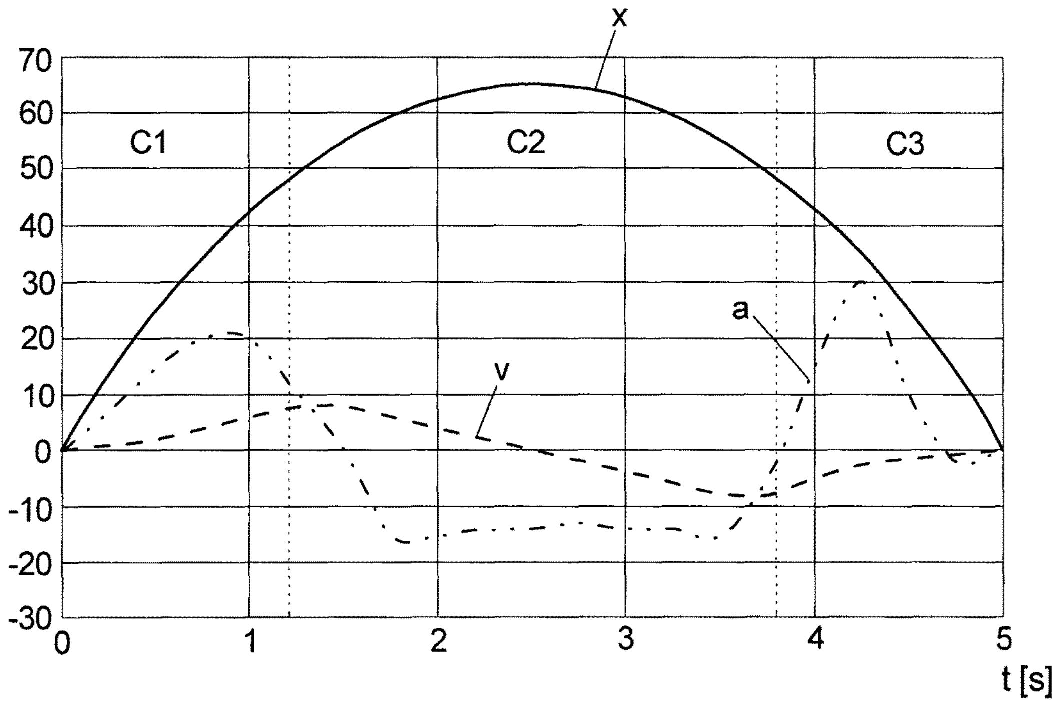
FIG. 9 shows a graph indicating a movement of the vehicle door when pushing open the vehicle door in an impulse fashion.

FIG. 9 illustrates the position x of a vehicle door 11 in case a user, within time period C1, pushes onto the vehicle door 11 to push open the vehicle door 11. Within the time period C1 the user acts onto the vehicle door to move the vehicle door towards the open position. After the user releases the vehicle door 11, in time period C2 the vehicle door 11 moves freely against gravity forces, such gravity forces causing a deceleration of the movement of the vehicle door 11 such that the angular velocity v of the vehicle door 11 continuously decreases at a substantially constant acceleration a, the position x of the vehicle door 11 at some point reverses and the vehicle door 11 is again closed. Within time period C3 a user may again grab the vehicle door 11 and may guide the vehicle door 11 for example towards a closed position.

Figure 10:
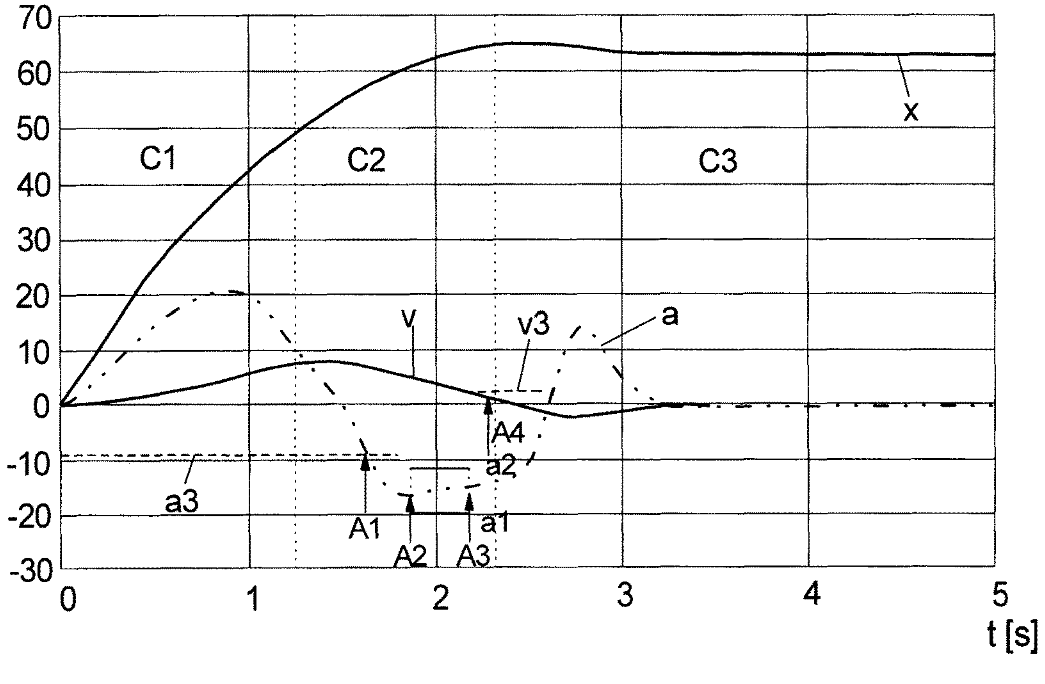
FIG. 10 shows a graph of the movement of the vehicle door, when braking the vehicle door at an opened position.

Whereas FIG. 9 shows a pushing open of the vehicle door 11 by manual user action against acting gravity forces, FIG. 10 illustrates how the vehicle door 11 may be arrested in an opened position such that the movement of the vehicle door 11 is terminated in the opened position. The control of the movement of the vehicle door 11 of FIG. 10 herein is based on an algorithm including the assessment whether the movement of the vehicle door 11 takes place at a substantially constant acceleration a in order to conclude that a movement due to gravity is present and to initiate a braking action onto the vehicle door 11 based on such conclusion.

As an example, within the algorithm of FIG. 10, a user initially, within the period of time C1, pushes onto the vehicle door 11 to open the vehicle door 11. After the user releases the vehicle door 11, in period of time C2 the vehicle door 11 moves freely, which is determined based on observing the acceleration a of the vehicle door 11.

Namely, first it is determined whether the acceleration a falls below a (negative) acceleration threshold a3, which in the example of FIG. 10 is the case at time point A1. This is based on the finding that in case gravity acts onto the vehicle door 11 towards the closed position, (i.e., in the negative acceleration direction of FIG. 10), gravity may cause an undesired closing of the vehicle door at a substantial speed, which potentially may be dangerous. Hence, if the acceleration a towards the closed position exceeds the threshold a3, this may indicate a closing movement of the vehicle door 11 due to gravity, which shall be prevented.

Subsequent to the determination that the acceleration a has fallen below the threshold a3 (i.e., the negative acceleration a exceeds the threshold a3) at time point A1, it is determined whether the acceleration a changes abruptly in its derivative. For this, a rate of change of the acceleration a may be determined, and from the rate of change it may be concluded for an abrupt change. This in the example of FIG. 10 is the case at time point A2, from which time point A2 on it is monitored whether the acceleration a remains substantially constant for a predetermined period of time.

If in the interval between time points A2 and A3 the acceleration a remains within bounds a1, a2, it is assumed that the acceleration a is sufficiently constant, and it hence is concluded that the movement is due to gravity. Once the velocity v at time A4 falls below a velocity threshold v3, the movement of the vehicle door 11 thus is braked and hence stopped, such that the vehicle door 11 is hold fixed in its opened position.

Figure 11:
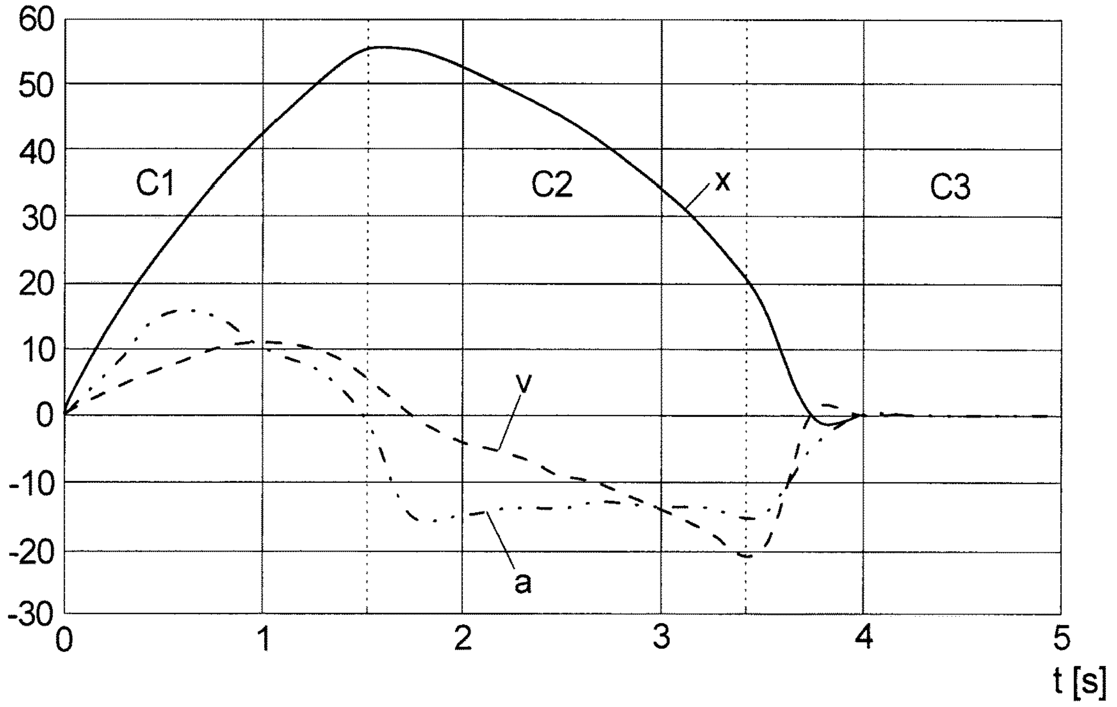
FIG. 11 shows a graph of a movement of a vehicle door in case of a continuous movement of the vehicle door by a user.
Figure 12:
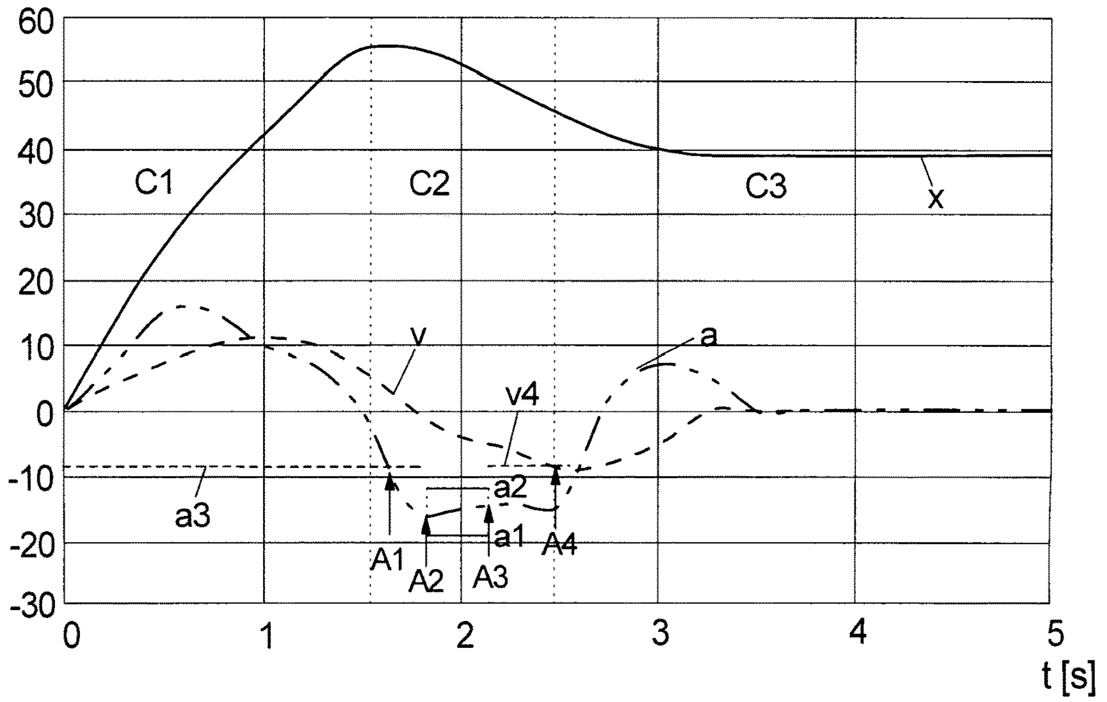
FIG. 12 shows a graph of the movement of the vehicle door, when braking the vehicle door at an opened position.
Figure 13A:
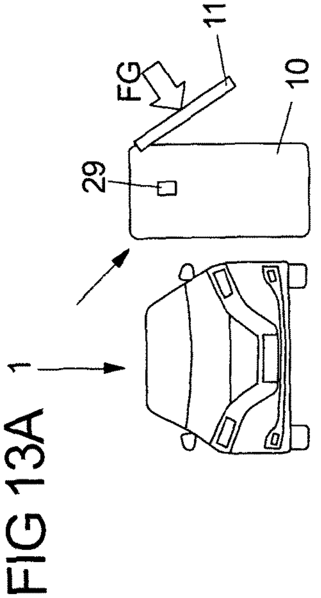
FIG. 13A shows a view of a vehicle at a flat parking position.
Figure 13B:
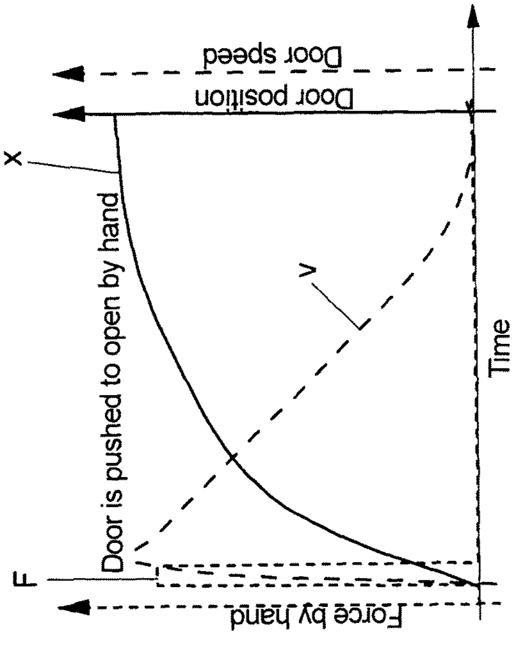
FIG. 13B shows a graph showing the movement of the vehicle door when pushed open by a user.

Whereas FIGS. 9 and 10 illustrate a movement of a vehicle door 11 due to an impulse pushing of the vehicle door 11 towards the opened position, FIGS. 11 and 12 show graphs illustrating a movement of the vehicle door 11 due to a continuous movement of the vehicle door 11 by a user holding onto the vehicle door 11 until releasing the vehicle door 11 in an opened position.

FIG. 11 herein shows a movement of the vehicle door 11 in which, within a period of time C1, a user continuously moves the vehicle door 11 towards an opened position. After the user has released the vehicle door 11, in time period C2 the vehicle door 11 freely moves due to gravity and, in time period C3, for example enters into a door lock and hence reaches a fully closed position.

Whereas FIG. 11 shows a movement of the vehicle door 11 by manual user action against acting gravity forces, FIG. 10 illustrates how the vehicle door 11 may be arrested in an opened position such that the movement of the vehicle door 11 is terminated in an opened position. Similarly as described with reference to FIG. 10, it first is monitored whether the acceleration a falls below a threshold a3. If this is the case (time point A1) it subsequently is checked whether the acceleration abruptly changes in its derivative (time point A2) and afterwards is sufficiently constant over a period of time (between time points A2, A3). If this is the case, it is concluded that a movement due to gravity is present, and at time point A4, at which the angular velocity the of the vehicle door 11 falls below a threshold A4, the movement of the vehicle door 11 is braked and the vehicle door 11 hence is stopped and arrested at a currently assumed position (period of time C3 in FIG. 12).

The threshold v3, v4 in FIGS. 10 and 12 differ. This is due to the fact that in the scenario of FIG. 10 the angular velocity v of the vehicle door 11 is positive after it has been determined at time point A3 that the acceleration a is substantially constant. The velocity v hence is compared to a first threshold v3 close to 0, and if the angular velocity v of the vehicle door 11 falls below the threshold v3 the vehicle door 11 is stopped. In the scenario of FIG. 12 the first threshold v3 has already passed, such that the angular velocity v of the vehicle door 11 (which is negative at the time point A3 at which it has been determined that the acceleration is substantially constant) is compared to the second threshold v4, and once the angular velocity v becomes smaller than the threshold v4 the movement of the vehicle door 11 is stopped.

The algorithm may in addition take into account an opening angle of the vehicle door 11. For example, in case of small opening angles the algorithm may be switched off.

Figure 14A:
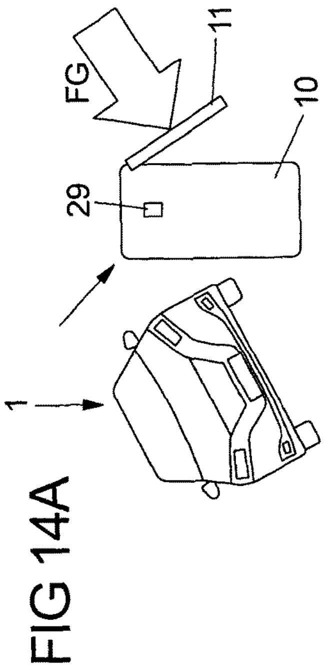
FIG. 14A shows a graph of a vehicle parked at an inclined position.
Figure 14B:
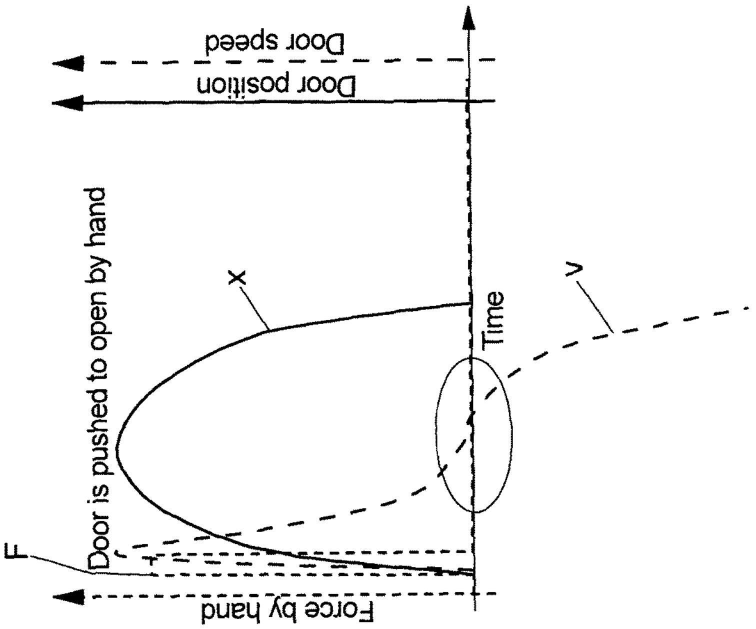
FIG. 14B shows a graph indicating a corresponding movement of the vehicle door when pushed open by a user.

In FIGS. 13A, 13B and 14A, 14B scenarios are illustrated in which a vehicle 1 is parked at a flat parking position (FIGS. 13A, 13B) and at an inclined position (FIGS. 14A, 14B).

In case a vehicle 1 is parked at a flat parking position (FIGS. 13A, 13B) a gravity force FG will act onto the vehicle door 11 towards the closed position, due to the inclination of the pivot axis of the vehicle door 11. The gravity force FG herein is small compared to a gravity force FG acting onto the vehicle door 11 in case the vehicle 1 is parked at an inclined position as illustrated in FIG. 14A, 14B. This has the effect that the gravity force FG acting onto the vehicle door 11 depends on the inclination of the vehicle 1, larger gravity forces FG causing a higher acceleration and faster closing movement of the vehicle door 11.

Dependent on the inclination of the vehicle 1, hence, parameters used for determining whether gravity forces act onto the vehicle door 11 may be adjusted. As an example, the threshold v1, v2 and a1, a2 of the embodiment of FIGS. 6 to 8 may be adjusted. Also, the threshold a1, a2, a3, v3, v4 of the embodiments of FIGS. 9 to 12 may be adjusted. In addition, the length of a period of time T over which the acceleration is determined to be constant may be adjusted based on the inclination of the vehicle 1.

By adjusting the parameters it can be made sure that also in a situation as in FIG. 14A a vehicle door 11 can reliably be stopped in case of a closing movement due to gravity. For example, if the vehicle 1 is parked at an inclined position as illustrated in FIG. 14A, in the embodiment of FIGS. 6 to 8 the velocity thresholds v1, v2 may be increased such that it may be concluded for a movement due to gravity at larger moving speeds of the vehicle door 11.

The idea underlying the invention is not limited to the embodiments described above, but can also be implemented in a completely different way.

As an example, a door drive may comprise a mechanical adjustment mechanism other than a cable drive, for example a pinion gear for coupling a drive motor to an adjustment member. Alternatively, the door drive can be configured as a spindle drive, in which, for example, a rotatable spindle engages with a spindle nut such that the spindle nut may be moved along the spindle by rotary movement of the spindle.

In the case of a mechanical locking device, a drive motor possibly is not present in the door drive device.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

REFERENCE NUMERALS 1 vehicle
10 vehicle body
100 vehicle opening
11 vehicle door
110 door interior
111 door hinge
2 door drive device
20 adjustment member
200, 201 end
202 hinge
21 brake device
210 actuator
22 drive motor
220 motor shaft
23 drive element
24 coupling element (pull cable)
240, 241 end
25 gear
26 shaft
27 sensor device
28 control device
29 inclination sensor
a acceleration
a1, a2, a3 acceleration threshold value
A1-A4 time point
C1-C3 region
D axis of rotation
F force
FG gravity force
G movement by gravity
M1, M2 manual movement
O opening direction
t time
T period of time
T1, T2 time point
v velocity
v1, v2, v3, v4 threshold While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A door drive device for at least one of adjusting and locking a vehicle door -relative to a vehicle body, the door drive device comprising:
an adjustment member;
a drive element operatively coupled to the adjustment member such that the adjustment member is movable with respect to the drive element to move the vehicle door relative to the vehicle body;
a sensor device configured to measure a measuring quantity indicative of a movement of the vehicle door and to provide a sensor signal; and
a control device configured to,
control an operation of the door drive device, and
compute, from the sensor signal obtained from the sensor device, an acceleration value indicative of an acceleration of the vehicle door,
wherein the control device is further configured to evaluate the acceleration value to distinguish movement of the vehicle door caused by a gravity force from movement of the vehicle door caused by a user action.

2. The door drive device of claim 1, wherein the control device is further configured to initiate braking of the movement of the vehicle door in response to detection of the movement of the vehicle door caused by the gravity force.

3. The door drive device of claim 1, wherein the control device is further configured to evaluate whether the acceleration value is substantially constant over a predetermined period of time or a predetermined period of position.

4. The door drive device of claim 3, wherein the control device is further configured to initiate the braking of a movement of the vehicle door in response to the acceleration value being substantially constant over the predetermined period of time or the predetermined period of position.

5. The door drive device of claim 3, wherein the control device is further configured to conclude that the acceleration value is substantially constant in response to a number of acceleration values lying within a predefined range over the predetermined period of time or the predetermined period of position.

6. The door drive device of claim 5, wherein the predefined range is bound by a lower acceleration threshold value and an upper acceleration threshold value.

7. The door drive device of claim 1, wherein the control device is further configured to determine a rate of change of the acceleration value and to conclude for a potential movement due to gravity based on the rate of change.

8. The door drive device of claim 1, wherein the control device is further configured to compute, from the sensor signal, a speed value indicative of a moving speed of the vehicle door, and evaluate the speed value to distinguish movement of the vehicle door caused by the gravity force from movement of the vehicle door caused by the user action.

9. The door drive device of claim 8, wherein the control device is further configured to initiate a braking of a movement of the vehicle door based on a comparison of the speed value to a predefined speed threshold.

10. The door drive device of claim 1, further comprising:
an inclination sensor configured to measure an inclination of the vehicle body, wherein the control device is configured to adapt, based on an output value of the inclination sensor, at least one parameter used for distinguishing movement of the vehicle door caused by the gravity force from movement of the vehicle door caused by the user action.

11. The door drive device of claim 1, wherein the drive element is coupled to a drive shaft, and the sensor device is configured to sense a rotational movement of the drive shaft.

12. The door drive device of one claim 1, further comprising:
a brake device operatively connected to the drive element and configured to brake the movement of the vehicle door.

13. The door drive device of claim 12, wherein the brake device is transferable between a brake state, to brake the movement of the vehicle door, a coupling state, to establish a force flow between the vehicle door and the vehicle body, and an uncoupling state to allow the vehicle door to freely pivot with respect to the vehicle body.

14. The door drive device of claim 13, further comprising:
an electric drive motor, wherein in response to the brake being in the coupling state, the drive motor is operatively coupled to the drive element and in response to the brake i-s-being in the uncoupling state, the drive motor is operatively decoupled from the drive element.

15. A method of operating a door drive device for at least one of adjusting and locking a vehicle door relative to a vehicle body, the method comprising:
measuring, by a sensor device, a measuring quantity indicative of a movement of the vehicle door to provide a sensor signal to a control device; and
controlling, using the control device, operation of the door drive device, wherein the controlling step includes,
computing, by the control device, from the sensor signal, an acceleration value indicative of an acceleration of the vehicle door, and
evaluating, by the control device, the acceleration value to distinguish movement of the vehicle door caused by a gravity force from movement of the vehicle door caused by a user action.

16. A method of operating a door drive device configured to adjust a vehicle door relative to a vehicle body, the method comprising:
receiving, from a sensor device, a number of acceleration values indicative of an acceleration of the vehicle door based on movement vehicle door relative to the vehicle body;
braking the door drive device, by a brake device, to stop the movement of the vehicle door, in response to the number of acceleration values being substantially constant.

17. The method of claim 16, wherein the receiving step includes receiving a number of negative acceleration values indicative of the door moving towards the vehicle body to a closed position and the braking step includes braking the door drive device in response to receiving the number of negative acceleration values.

18. The method of claim 17, further comprising:
receiving, from the sensor device, a number of velocity values indicative of a speed of the vehicle door exceeding a first velocity threshold; and
braking the door drive device, by a brake device, in response to the number of velocity values exceeding the first velocity threshold.

19. The method of claim 18, further comprising:
receiving a number of positive acceleration values and the number of velocity values falling below a second velocity threshold; and
braking the door drive device, by a brake device, in response to the number of velocity values falling below the second velocity threshold.

20. The method of claim 19, wherein the second velocity threshold is greater than the first velocity threshold.

* * * * *